(12) United States Patent
Schonfeld et al.

(10) Patent No.: US 10,565,388 B2
(45) Date of Patent: Feb. 18, 2020

(54) METHOD AND SYSTEM FOR PROVIDING DIGITAL MEDIA RENTAL

(75) Inventors: Robert Schonfeld, Sherman Oaks, CA (US); Arnaud Robert, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 902 days.

(21) Appl. No.: 12/459,163

(22) Filed: Jun. 26, 2009

(65) Prior Publication Data

US 2010/0333211 A1    Dec. 30, 2010

(51) Int. Cl.
| | |
|---|---|
| *G06F 21/62* | (2013.01) |
| *G06F 21/10* | (2013.01) |
| *H04N 21/254* | (2011.01) |
| *H04N 21/835* | (2011.01) |
| *H04L 29/06* | (2006.01) |

(52) U.S. Cl.
CPC .......... *G06F 21/6209* (2013.01); *G06F 21/10* (2013.01); *H04L 63/10* (2013.01); *H04N 21/2541* (2013.01); *H04N 21/835* (2013.01); *H04L 2463/101* (2013.01)

(58) Field of Classification Search
CPC ........ G06Q 30/0207–0277; G06F 21/10–6209
USPC .............................................. 726/28; 705/59
See application file for complete search history.

(56) References Cited

U.S. PATENT DOCUMENTS

| | | | |
|---|---|---|---|
| 6,901,386 B1 | 5/2005 | Dedrick | |
| 7,209,892 B1 * | 4/2007 | Galuten et al. | ............ 705/26.62 |
| 7,320,140 B1 | 1/2008 | Boyer | |
| 7,487,363 B2 | 2/2009 | Alve | |
| 7,624,415 B1 * | 11/2009 | Zhang | ................ H04N 7/17318 725/86 |
| 7,716,349 B1 | 5/2010 | Hendricks | |
| 8,364,595 B1 | 1/2013 | Ringewald | |
| 8,371,855 B1 | 2/2013 | Gayles | |

(Continued)

FOREIGN PATENT DOCUMENTS

| | | |
|---|---|---|
| CN | 1386960 A | 12/2006 |
| CN | 1886960 | 12/2006 |

(Continued)

OTHER PUBLICATIONS

White, Ron, "How Computers Work", Millennium Ed., Que Corporation, Indianapolis, IN, 1999.*

(Continued)

*Primary Examiner* — Chrystina E Zelaskiewicz
(74) *Attorney, Agent, or Firm* — Farjami & Farjami LLP

(57) ABSTRACT

There is provided a method and system for allocating access to digital media content. In one embodiment, the system may comprise a media server accessible over a communications network, a processor of the media server being configured to encrypt the digital media content to produce a secondary license for the digital media content, and to provide a temporary license key allowing a user to access at least a first portion of the digital media content during an activation usage interval of the secondary license for that portion of the digital media content assigned to the user. The media server further comprises an assignment database configured to store an assignment status of the license. Such a system is configured to permit the user to access the assigned portion of the digital media content during the usage interval.

19 Claims, 3 Drawing Sheets

(56) References Cited

U.S. PATENT DOCUMENTS

| | | | |
|---|---|---|---|
| 8,620,817 B2* | 12/2013 | Tabet | G06F 21/105 705/50 |
| 8,706,638 B2 | 4/2014 | Farrugia | |
| 2002/0013772 A1 | 1/2002 | Peinado | |
| 2002/0184156 A1 | 12/2002 | Tadayon | |
| 2003/0076955 A1* | 4/2003 | Alve et al. | 380/201 |
| 2004/0267552 A1* | 12/2004 | Gilliam | G06F 21/10 705/59 |
| 2006/0010075 A1 | 1/2006 | Wolf | |
| 2006/0050697 A1* | 3/2006 | Li | H04L 29/06027 370/389 |
| 2006/0085634 A1 | 4/2006 | Jain | |
| 2006/0179455 A1 | 8/2006 | Jun | |
| 2007/0156587 A1 | 7/2007 | Yu | |
| 2007/0198421 A1 | 8/2007 | Muller | |
| 2007/0201702 A1 | 8/2007 | Hendricks | |
| 2008/0046372 A1* | 2/2008 | Lutnick | G06F 21/10 705/51 |
| 2008/0103977 A1 | 5/2008 | Khosravy | |
| 2008/0109910 A1 | 5/2008 | Day | |
| 2008/0114836 A1 | 5/2008 | Zellner | |
| 2008/0212441 A1* | 9/2008 | Babowicz | 369/83 |
| 2008/0263624 A1 | 10/2008 | Nakahara | |
| 2008/0319867 A1 | 12/2008 | Rosenberg | |
| 2009/0193526 A1 | 7/2009 | Sweazey | |
| 2010/0125511 A1 | 5/2010 | Jouret | |
| 2011/0191859 A1 | 8/2011 | Näslund | |
| 2011/0313938 A1 | 12/2011 | Dicke | |
| 2011/0314556 A1 | 12/2011 | Dicke | |
| 2012/0050004 A1 | 3/2012 | Curtis | |
| 2013/0041984 A1 | 2/2013 | McCoy | |
| 2013/0124868 A1 | 5/2013 | Sorotokin | |

FOREIGN PATENT DOCUMENTS

| | | |
|---|---|---|
| CN | 101610256 | 12/2009 |
| CN | 101610256 A | 12/2009 |
| WO | WO 0239206 | 5/2002 |
| WO | WO 2005/060199 | 6/2005 |

OTHER PUBLICATIONS

Weiguo et al: "A Metadata-based Interoperable Digital Rights Management System Architecture", Computational Science and Optimization (CSO), 2010 Third International Joint Conference, May 28, 2010, pp. 432-434.

http://company.overdrive.com/libraries/public-libraries/faq/, OverDrive, Inc. Web. Oct. 19, 2017.

http://en.wikipedia.org/wiki/OverDrive,_Inc., Wikipedia Foundation, Inc. Web. Oct. 19, 2017.

http://company.overdrive.com/company/who-we-are/history/, OverDrive, Inc. Web. Oct. 19, 2017.

* cited by examiner

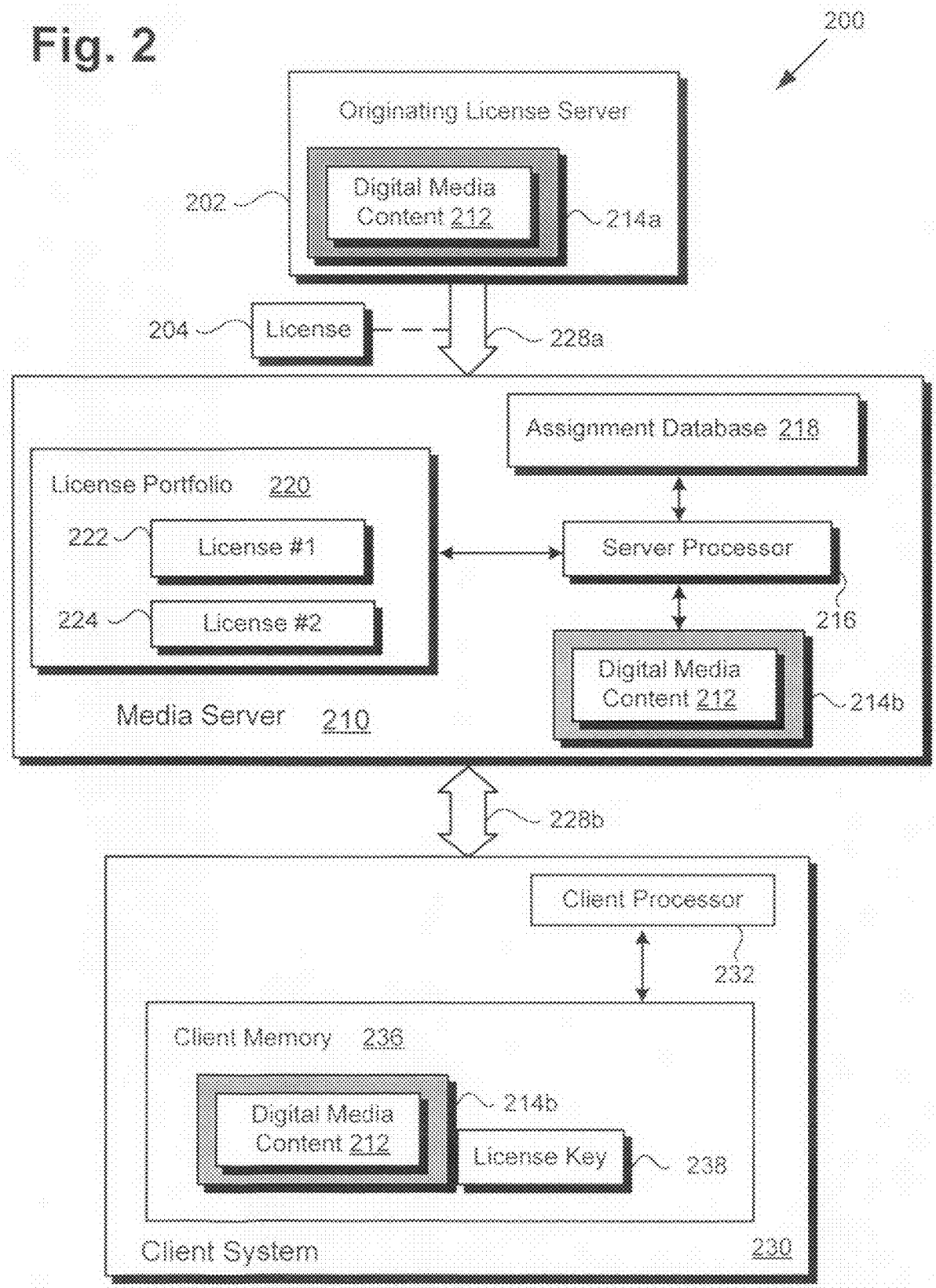

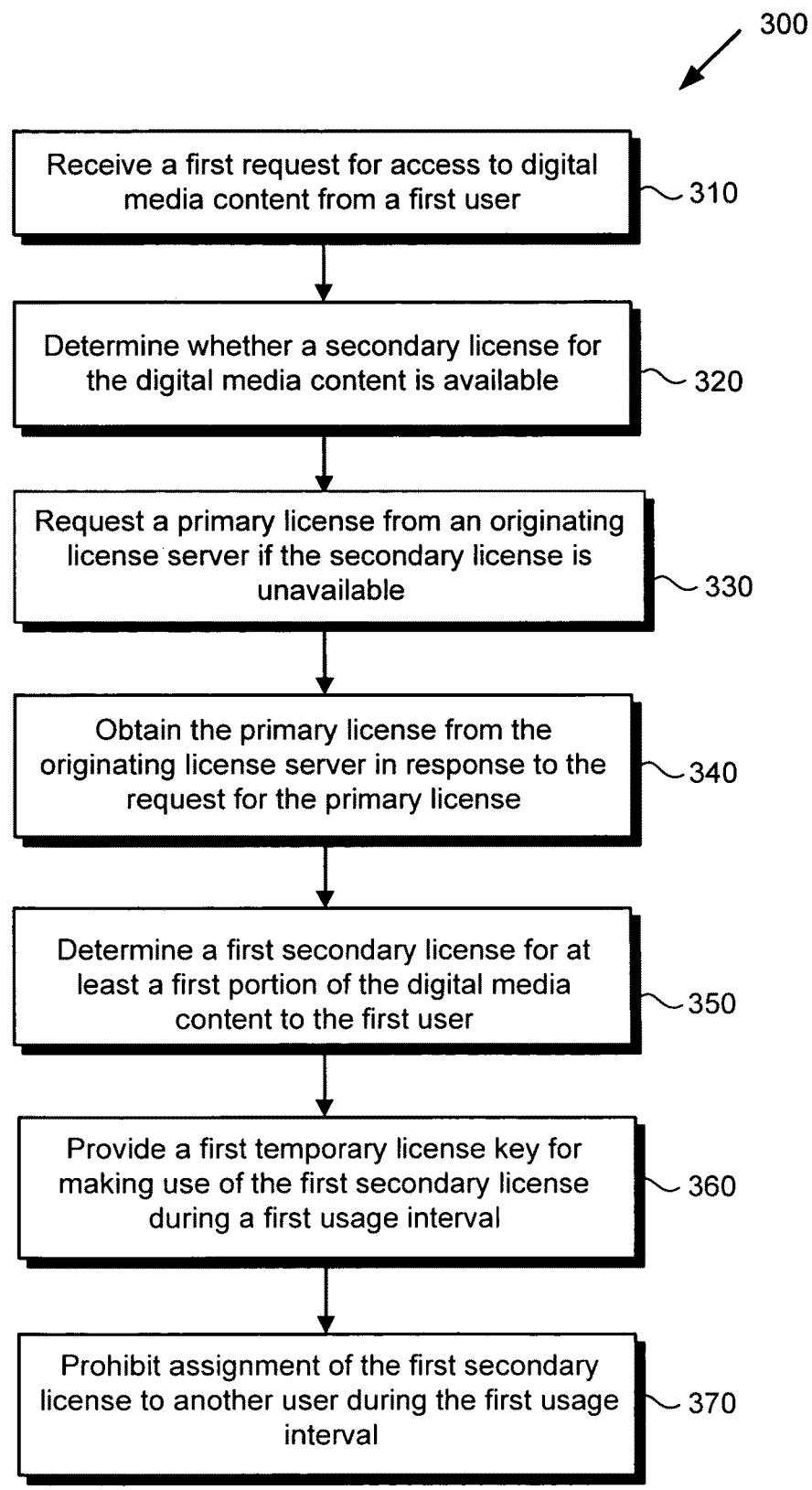

METHOD AND SYSTEM FOR PROVIDING DIGITAL MEDIA RENTAL

BACKGROUND OF THE INVENTION

1. Field of the Invention

The present invention relates generally to the distribution of media content. More particularly, the present invention relates to the computer mediated distribution of digital media content.

2. Background Art

Setting aside for a moment the legal and ethical implications of unrestricted content sharing, the nearly unprecedented popularity of peer-to-peer (P2P) file-sharing applications such as Napster, Grokster, and BitTorrent is testimony to the public's desire to engage in content sharing. A cynical interpretation of such a broad based enthusiasm may lead to the conclusion that the content sharing behavior has been so popular because it was titillatingly illicit, resulted in the acquisition of creative content for free, or for both of those reasons. In retrospect, however, it may be that rather than, or at least in addition to the less admirable motivations often attributed to it, the immediate popularity of file-sharing was a harbinger of the more recent popularity of the Internet based social networking applications that have revolutionalized the way that people, particularly young people, communicate and remain in contact with one another in this increasingly globalized and computer mediated age.

Almost anyone who uses personal email, for example, is probably by now familiar with the joys and aggravations flowing from the speed and ease with which large amounts of content can be distributed by almost anyone else. The slideshow of photographs taken during a recent vacation by a friend or neighbor, once the bane of the occasional visit to so-and-so's home, is now almost unavoidable due to its nearly limitless potential for replication and distribution as digital media content. More enjoyably, that geographically distant but emotionally significant birthday celebration or family event that we just couldn't arrange to attend in person, is now something that we can experience as a result, for instance, of viewing an audio-visual recording of the event, distributed, again, as digital media content.

P2P file-sharing, social networking applications, email, and public outlets such as YouTube for providing widespread access to personally produced content, all of these are manifestations of the profound way in which personal computing devices and network connectivity have extended the traditional definitions of community and of social interaction. But a natural tension arises when the basic impulse to share the content that we enjoy with our friends begins to conflict with the legitimate economic interests of the creators and producers of commercial content in protecting their potentially valuable intellectual property rights.

As a somewhat archaic but hopefully illustrative example of how advances in computer and network technologies make it both easier and more challenging to appropriately share protected content, consider the old fashioned vinyl 33⅓ rpm long play (LP) record of a nearly bygone era. In those days, when the state-of-the-art in music content distribution was vinyl records, our friends were likely to live close by. When we, or one of our friends, got a new record album, a common act of friendship and shared enjoyment was to listen together to one or more of the songs. In that environment, "sharing" had its purest and most literal meaning, because in order to share the content corresponding to a recorded song, we either had to share the experience in common, i.e., listen to the record together, or we had to temporarily exchange possession of the content, e.g., I lend the record to my friend and concurrently dispossess myself of it for the period of the loan. As a result, the interests of the person wanting to "share" the content with a friend, and the intellectual property interests of the creators and producers of the content in regulating unauthorized use of the content, were naturally aligned.

Today, however, due in part to the extended communities made possible by our Internet based social networks, the friends with whom we may want to share an experience can include individuals in far flung locations. In addition, the creative content we now consume is likely to be in the form of digital media files, which are not only readily transferable over communication networks, but are just as readily reproduced, in whole or in part, and redistributed using our personal computers and the networks supporting our communications with our friends. Consequently, while advances in technology make it easier to make and maintain friendships over long distances, and to reproduce and distribute meaningful content for others to enjoy, those advances have not replicated the experience of sharing content in its traditional sense. That is to say, "sharing" in its modern incarnation as file-sharing, for example, is not really sharing at all, because it does not require me to relinquish the ability to access an item of content in order to make that content available for the exclusive use of another.

Accordingly, there is a need to overcome the drawbacks and deficiencies in the art by providing a solution for allocating access to digital media content in a manner that both promotes shared enjoyment of creative content in its traditional sense, and protects the valid commercial interests of content creators and producers.

SUMMARY OF THE INVENTION

There are provided methods and systems for allocating access to digital media content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 shows a more detailed embodiment of a system for allocating access to digital media content, according to one embodiment of the present invention; and FIG. 3 is a flowchart presenting a method for allocating access to digital media content, according to one embodiment of the present invention.

DETAILED DESCRIPTION OF THE INVENTION

Figure 1:
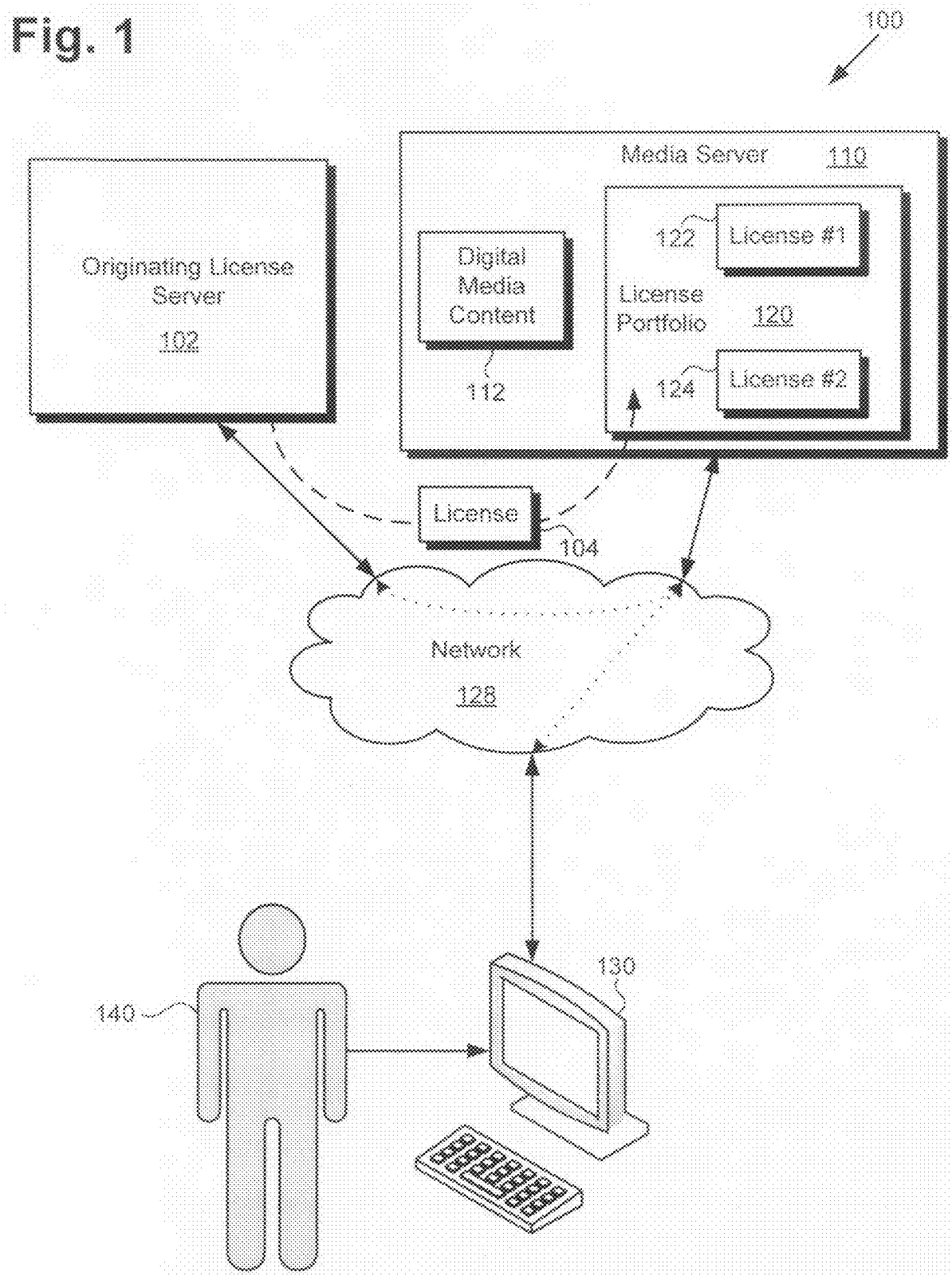
FIG. 1 shows a block diagram of an example system for allocating access to digital media content, according to one embodiment of the present invention.

The present application is directed to a method and system for allocating access to digital media content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

The inventors have realized that due to the ease with which digital media content can be reproduced and distributed using widely available computing and network systems, an effective solution for enabling authorized secondary distribution of digital media content while avoiding its unauthorized overuse includes at least temporary exchange of licensing rights to the content. For example, a genuine purchaser of licensed digital media content typically enjoys the right to use the licensed product to exhaustion. As an alternative to personally using the content, the genuine purchaser may transfer the right to use of the licensed product in a secondary transaction in which a packaged product embodying the media, such as a digital video disc (DVD) or Blu-ray disc, for example, typically changes possession. However, because digital media content can be copied and stored in a memory of a personal computer (PC), for example, mere exchange of a packaged product is no assurance that the party purportedly transferring genuine ownership of the digital media content is in fact relinquishing access to that content. In addition, and again because digital media content can be copied and stored on a PC, the genuine owner may engage in unauthorized secondary distribution of the content by, for example, burning it to one or more units of optical media and distributing those units to other users, either in exchange for payment, or otherwise.

According to various embodiments of the present inventive concepts, a genuine purchaser of digital media content is provided a mechanism for sharing the digital media content with others in an authorized way. In some embodiments, for example, a genuine purchaser of a digital media file of a feature film may sell, rent, or loan the file to another user by assigning them a license to view the file contents in a secondary transaction. As a result, the assignee of the license would acquire the rights of authorized access to the digital media content, and the assignor, e.g., the original genuine purchaser, would relinquish such access rights, during the assignment period, which may be permanent or temporary. In other words, authorized access to the digital media content may be allocated according to the assignment status of the license for the digital media content. As a result, a genuine purchaser of the digital media content may enjoy the privileges of authorized ownership of a commercial product, such as sharing of the product in its traditional sense, while the creators and producers of the content receive protection from its overuse through concurrent multiple viewing and unauthorized redistribution.

FIG. 1 shows a block diagram of an example system for allocating access to digital media content capable overcoming the drawbacks and deficiencies of the conventional art, according to one embodiment of the present invention. In the embodiment of FIG. 1, system 100 comprises media server 110 on which are stored digital media content 112, and license portfolio 120 including digital media content licenses 122 and 124. Also shown in FIG. 1 are originating license server 102, license 104 being transferred from originating license server 102 to media server 110, network 128, client system 130, and user 140.

According to the embodiment of FIG. 1, user 140 may utilize client system 130 and network 128 to communicate with media server 110 in order to request access to digital media content 112. Media server 110 can be configured to comply with the request by encrypting digital media content 112 to produce a secondary license, such as one of digital media content licenses 122 or 124, for all or a portion of digital media content 112 to user 140, and providing user 140 a temporary license key enabling access to the assigned portion of digital media content 112. In effect, media server 110 can be configured to allocate access to digital media content 112 by partitioning the assignment of license rights in time or through usage. As a result, media server 110 may be utilized to sell, rent, or lend access rights for digital media content 112 to a user, such as user 140, while prohibiting concurrent access to digital media 112 by another user.

In one embodiment, for example, system 100 may correspond to a home based business providing movie rentals of feature film content stored as digital media files. In that embodiment, media server 110 may comprise a PC, or other home computer platform, for example, rather than a dedicated network media server as shown in FIG. 1. More generally, as the computing power of portable communications devices continues to increase, it is contemplated that in some embodiments media server 110 may comprise a portable device such as a mobile telephone, a digital media player, a personal digital assistant (PDA), a portable computer, or a gaming console, for example. According to any of those embodiments, media server 110 may receive multiple requests for access to digital media content 112. A first request from a first user may be accommodated by encryption of digital media content 112 to produce secondary license 122 for assignment to the first user, for example, while a subsequent request from a second user may be similarly accommodated by assignment of secondary license 124 to the second user.

Each of secondary licenses 122 and 124 may be associated with a usage interval during which temporary license keys for making use of secondary licenses 122 and 124 are provided to the respective first and second users and enable access to digital media content 112. However, in some embodiments it may be difficult or even undesirable to anticipate the volume of overlapping requests for access to digital media content 112. As a result, media server 110 may receive a request for access to digital media content 112 at a time when no secondary license is available in license portfolio 120 for assignment to another user. In those embodiments, media server 110 may be configured to obtain a primary license for digital media content 112 from originating license server 102. For example, as shown in FIG. 1, media server 110 can request primary license 104 from originating license server 102 and obtain the additional license, via network 128.

Turning now to FIG. 2, FIG. 2 provides a more detailed embodiment of a system for allocating access to digital media content, according to one embodiment of the present invention. System 200, in FIG. 2, includes client system 230 receiving a data transfer via network communication link 228b from media server 210, which in turn receives primary license 204 for digital media content 212 protected by digital rights management wrapper (DRM) 214a from originating license server 202 over communication link 228a. As may be seen from FIG. 2, media server 210 includes digital media content 212 protected by secondary DRM 214b, server processor 216, assignment database 218, and license portfolio 220. Also included in FIG. 2 is client system 230 corresponding to client system 130, in FIG. 1. As further shown in FIG. 2, client system 230 comprises client processor 232, and client memory 236.

Originating license server 202, media server 210, digital media content 212, primary license 204, and license portfolio 220, in FIG. 2, correspond respectively to originating license server 102, media server 110, digital media content 112, primary license 104, and license portfolio 120, in FIG. 1. As shown in FIG. 2, license portfolio 220 includes digital media content licenses 222 and 224, corresponding to digital media content licenses 122 and 124, in FIG. 1. DRM 214a, secondary DRM 214b, temporary license key 238, and assignment database 218 are not expressly represented in FIG. 1.

According to the present embodiment, digital media content 212 wrapped by secondary DRM 214b, and temporary license key 238 are located in client memory 236, having been received from media server 210 via network communication link 228. In another embodiment, however, one or both of media content 212 wrapped by secondary DRM 214b, and temporary license key 238 may not exist as local assets of client system 230. In that embodiment, for example, secondary DRM 214b may wrap digital media content 212 on media server 210. In addition, in that embodiment, temporary license key 238 may be associated with client system 230, but reside on media server 210. Returning to the example embodiment shown in FIG. 2 in which digital media content 212 wrapped by secondary DRM 214b, and temporary license key 238 are imported to be local assets of client system 230, network communication link 228b may represent download of those local assets over network 128 in FIG. 1, which may be a packet network such as the Internet, for example. Once transferred, digital media content 212 wrapped by secondary DRM 214b, and temporary license key 238 may be stored in client memory 236 and accessed locally on client system 230. It is noted that network communication link 228b is shown as a two-way communication, and may additionally represent periods of persistent connectivity between media server 210 and client system 230 over network 128. Moreover, client processor 232 may be the central processing unit for client system 230, for example, in which role client processor 232 runs the client operating system and facilitates access to and playback of digital media content 212.

Although the present discussion has thus far described digital media content 212, secondary DRM 214b, and temporary license key 238 as residing in client memory 236, or, alternatively, on media server 210, those characterizations are merely representative. For example, in some embodiments, temporary license key 238 and/or digital media content 212, and secondary DRM 214b may be stored on a computer-readable medium, for use by a processor.

The expression "computer-readable medium," as used in the present application, refers to any medium that provides instructions to a processor, such as client processor 232, in FIG. 2. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, Blu-ray, or other optical disc; a RAM, programmable read-only memory (PROM), erasable PROM (EPROM), FLASH memory, or a transmission carrier wave.

The systems embodied by FIG. 1 and FIG. 2 will now be further described by reference to FIG. 3, which presents flowchart 300 describing a method for use by a media server, according to one embodiment of the present invention, for allocating access to digital media content. The steps shown in flowchart 300 are merely exemplary, however, so that a step may consist of one or more substeps or may involve specialized equipment or materials, as known in the art. While steps 310 through 370 indicated in flowchart 300 are sufficient to describe one embodiment of the present invention, other embodiments may utilize steps different from those shown in flowchart 300, or may include more, or fewer steps.

Beginning with step 310 of flowchart 300 and referring to FIG. 1, step 310 comprises receiving a first request for access to digital media content 112 from first user 140. Step 310 may correspond to receipt by media server 110 of data corresponding to such a request from client system 130, via network 128. Digital media content 112 may comprise an entire digital media file, which may be a streamable media file, for example. Digital media content 112 may comprise audio-visual content, such as a feature film, for example, in high definition (HD) or standard definition (SD) video formats. Alternatively, digital media content 112 may comprise music content, gaming content, or any of a variety of entertainment or instructional content, for example.

The exemplary method of flowchart 300 continues with step 320, which comprises determining whether a secondary license is available for use by first user 140 to access digital media content 112. Step 320 may be performed by media server 110, and can correspond to determining whether license portfolio 120 contains an available license for digital media content 112, such as one of licenses 122 or 124. As explained previously in conjunction with FIG. 1, in some embodiments a secondary license for digital media content 112 may not be available, for example, because all existing secondary licenses are presently assigned to other users. In those embodiments, a method for allocating access to digital media content 112 may proceed by media server 110 requesting primary license 104 for digital media content 112 from originating license server 102, in step 330, and obtaining primary license 104 from licensor server 102 in response to the request, in step 340.

Continuing with step 350 of flowchart 300, step 350 comprises determining a first secondary license, based on primary license 104 and the first request, for at least a first portion of digital media content 112 to first user 140. As was the case for steps 310 through 340, step 350 may be performed by media server 110. Referring to FIG. 2, determination of a secondary license, in step 350, may be accompanied by storage in assignment database 218 of data corresponding to the present assignment status of the license. For instance, assignment of secondary license 222 to the first user may be accompanied by creation in assignment database of a record of the present assignment of secondary license 222 to the first user. Thus, entries in assignment database 218 may be used by media server 210 when performing iterations of determining step 320 for subsequently received user requests for access to digital media content 212. Moreover, in embodiments in which media server 210 is in possession of a number of secondary licenses for digital media content 212 in license portfolio 220, determination of a first secondary license in step 350 may be followed by decrementing the number of secondary licenses for digital media content 212 by one.

Although in some embodiments, a secondary license for the entirety of digital media content 212 may be determined in step 350, in other embodiments, a secondary license for only one or more portions of digital media content may be assigned at a time, such as at least a first portion of digital media content 212. For example, consider the scenario, invoked previously, in which media server 210 is used to support a home based movie rental business. In that case, digital media content 212 may comprise a media file containing a particular movie. However, it may be strategically advantageous for the operator of media server 210 to maximize the number of secondary users, i.e., renters, to whom access to digital media content 212 can be assigned during a particular time interval. Where, for instance, assignment of a portion of digital media content 212 is temporary and based on usage, such as a single viewing of the relevant content, licensing of the entirety of digital media content 212 would require a waiting period for reuse of digital media content 212 lasting at least as long as the playback time of the entire movie. By licensing only a first portion of the movie, however, such as the first scene, a predetermined number of frames, or a predetermined playback time, for example, media server 210 might be able to recycle content, i.e., make the same unit of digital media content re-available for licensing, more rapidly. In that way, media server 210 might be able to accommodate a large number of requests for access to digital media content 212, such as one hundred requests, for example, with less than one hundred full licenses for digital media content 212, thereby reducing operating overhead while avoiding unlicensed overuse of digital media content 212.

In one embodiment, determining a secondary license for some or all of digital media content 212 may correspond to encrypting digital media content 212 by media server 210 to produce a secondary license, such as a rental license, for the digital media content. As shown in FIG. 2, in some embodiments, generation of a secondary license may correspond to wrapping digital media content 212 in a secondary DRM 214b produced by encryption of digital media content 212 by media server 210, before making the content available to the user.

Flowchart 300 continues with step 360, comprising providing first temporary license key 238 for making use of the first secondary license, first temporary license key 238 providing access to the portion of digital media content 212 to which a secondary license was assigned in step 350. First temporary license key 238 may be issued by media server 210, and may be designed to provide access to some or all of digital media content 212 for the duration of a first usage interval. The first usage interval, which may be permanent in the case of resale of digital media content 212, is contemplated as defining a temporary interval corresponding to a rental or lending transaction during which the user to whom a secondary license for some or all of digital media content 212 has been assigned may access that content. In some embodiments, the first usage interval may correspond to a predetermined period of time, such as twenty-four hours, for example. In other embodiments, the first usage interval may correspond to one or more usage rules for the digital media content, and may correspond to a predetermined number of times the user utilizes the digital media content, such as a single use, for example.

In addition to providing first temporary license key 238, in some embodiments, providing access to digital media content 212 may comprise copying digital media content 212 received from originating license server 202, and sending the copied digital media content to the user, e.g., as digital media content 212 residing in client memory 236. In other embodiments, providing access to digital media content 212 may comprise streaming the digital media content to client system 230 over network communication link 228b.

Although in some embodiments, the first usage interval may start to run concurrently with provision of first temporary license key 238, in other embodiments, a method for allocating access to digital media content 212 may include initiating the first usage interval subsequent to provision of first temporary license key 238. For example, in one embodiment the first usage interval may correspond to a persistent connectivity interval of client system 130 and media server 110 over network 128. In that embodiment, initiation of the usage interval may be performed by media server 210 in response to receipt of data from client system 230 confirming client system connectivity. The first temporary license key would then enable client system 230 to access digital media content 212 as long as network connectivity of client system 230 and media server 210 is not intentionally interrupted by client system 230, at which time the first usage interval could be expired by media server 210.

Moving now to step 370 of flowchart 300, step 370 comprises prohibiting assignment of the first secondary license determined to the first user in step 350, to another user during the first usage interval. Step 370 may be performed by media server 210, and corresponds to reserving the licensed content for the exclusive use of the first user assignee on a temporary basis. Prohibition, in step 370 can be effectuated algorithmically, using server processor 216, and by reference to one or both of assignment database 218 and license portfolio 220. As previously mentioned, assignment database 218 is configured to store the assignment status of licenses held on media server 210. In addition, in embodiments in which the number of licenses available in license portfolio 220 is decremented by one according to each assignment, absence of an available license in license portfolio 220 avoids concurrent assignment of a single license, e.g., unlicensed overuse of the digital media content.

Thus, step 370 is consistent with an iteration of the steps of flowchart 300 for a second user request for access to digital media content 212a. In that event, finding that an existing first secondary license has been assigned to the first user and that the first usage interval is still in effect, media server 210 can be configured to determine availability of a second secondary license, obtain a second primary license from originating license server 102 if a secondary license is not present in license portfolio 220, determine the second secondary license for at least a portion of the digital media content to the second user, provide a second temporary license key for making use of the second secondary license and providing access to the digital media content during a second usage interval, and prohibit assignment of the second secondary license to another user during the second usage interval.

Although not expressly enumerated in flowchart 300 of FIG. 3, a method for allocating access to digital media content may further include expiring the first usage interval of the first secondary license and updating assignment database 218 to reflect that change. As a result, the present method enables subsequent reassignment of the first secondary license, after the first usage interval, for example, through incrementing the number of secondary licenses available in license portfolio 220 by one after lapse of the first usage interval of first temporary license key 238.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for use by a media server for allocating access to a first digital media portion of a digital media file stored in the media server to a first user and a second digital media portion of the digital media file to a second user, where the first digital media portion includes a first number of frames from the digital media file, the second digital media portion includes a second number of frames from the digital media file, and the first number of frames of the first digital media portion and the second number of frames of the second digital media portion of the digital media file are mutually exclusive, the method comprising:
   obtaining, using a hardware processor of the media server, the digital media file and an associated primary license authorizing a number of secondary licenses from an originating license server;
   receiving, using the hardware processor of the media server, a first request for access to the digital media file from a first client system of the first user over a communications network;
   determining, using the hardware processor of the media server, a first secondary license based on the primary license and the first request for access to the digital media file from the first client system of the first user;
   providing, using the hardware processor of the media server, a first temporary license key to the first user for making use of the first secondary license, the first temporary license key providing access to the first digital media portion of the digital media file;
   copying or streaming, using the hardware processor of the media server, the first digital media portion obtained from the digital media file to the first client system over the communications network, in response to the first request from the first client system of the first user and provision of the first temporary license key;
   receiving, using the hardware processor of the media server, a second request for access to the digital media file from a second client system of the second user over the communications network;
   determining, using the hardware processor of the media server and in response to the second request, whether the number of secondary licenses is reached;
   requesting, using the hardware processor of the media server, a second primary license for the media file from the originating license server, in response to determining that the number of secondary licenses is reached;
   obtaining, using the hardware processor of the media server, the second primary license from the originating license server, in response to requesting the second primary license from the originating license server, wherein the first primary license and the second primary license authorize concurrent use of the digital media file by the media server for responding to the first request and the second request for access to the digital media file, thereby eliminating a need for storing another copy of the digital media file in the media server;
   determining, using the hardware processor of the media server, a second secondary license based on the second primary license and the second request for access to the second digital media portion of the digital media file from the second client system of the second user;
   providing, using the hardware processor of the media server, a second temporary license key to the second user for making use of the second secondary license, the second temporary license key providing access to the second digital media portion of the digital media file concurrent with the first temporary license key providing access to the first digital media portion of the digital media file; and
   copying or streaming, using the hardware processor of the media server, the second digital media portion obtained from the digital media file to the second client system over the communications network, in response to the second request from the second client system of the second user and provision of the second temporary license key, concurrently with copying or streaming, at least in part, the first digital media portion obtained from the digital media file to the first client system over the communications network.

2. The method of claim 1, further comprising prohibiting assignment of the first secondary license for the first digital media portion of the digital media file to a user other than the first user during a first usage interval.

3. The method of claim 1 further comprising:
   prohibiting assignment of the second secondary license for the second digital media portion of the digital media file to a user other than the second user during a second usage interval.

4. The method of claim 1, wherein the first digital media portion includes a number of frames from the digital media file, and wherein the number of frames is less than all frames of the digital media file.

5. The method of claim 1, wherein the first digital media portion obtained from the digital media file is streamed to the first client system over the communications network, and wherein the second digital media portion obtained from the digital media file is streamed to the second client system over the communications network.

6. The method of claim 1, wherein the first digital media portion of the digital media file is a predetermined playback time less than a playback time for playing back all of the digital media file.

7. The method of claim 1, further comprising canceling the first secondary license to the first user.

8. A system for allocating access to a first digital media portion of a digital media file to a first user and a second digital media portion of the digital media file to a second user, where the first digital media portion includes a first number of frames from the digital media file, the second digital media portion includes a second number of frames from the digital media file, and the first number of frames of the first digital media portion and the second number of frames of the second digital media portion of the digital media file are mutually exclusive, the system comprising:
   a media server storing the digital media file and accessible over a communications network;
   a hardware processor of the media server configured to:

obtain the digital media file and an associated primary license authorizing a number of secondary licenses from an originating license server;

receive a first request for access to the digital media file from a first client system of the first user over a communications network;

determine a first secondary license based on the primary license and the first request for access to the digital media file from the first client system of the first user;

provide a first temporary license key to the first user for making use of the first secondary license, the first temporary license key providing access to the first digital media portion of the digital media file;

copy or stream the first digital media portion obtained from the digital media file to the first client system over the communications network, in response to the first request from the first client system of the first user and provision of the first temporary license key;

receive a second request for access to the digital media file from a second client system of the second user over the communications network;

determine, in response to the second request, whether the number of secondary licenses is reached;

request a second primary license for the media file from the originating license server, in response to determining that the number of secondary licenses is reached;

obtain the second primary license from the originating license server, in response to requesting the second primary license from the originating license server, wherein the first primary license and the second primary license authorize concurrent use of the digital media file by the media server for responding to the first request and the second request for access to the digital media file, thereby eliminating a need for storing another copy of the digital media file in the media server;

determine a second secondary license based on the second primary license and the second request for access to the second digital media portion of the digital media file from the second client system of the second user;

provide a second temporary license key to the second user for making use of the second secondary license, the second temporary license key providing access to the second digital media portion of the digital media file concurrent with the first temporary license key providing access to the first digital media portion of the digital media file; and copy or stream the second digital media portion obtained from the digital media file to the second client system over the communications network, in response to the second request from the second client system of the second user and provision of the second temporary license key, concurrently with copying or streaming, at least in part, the first digital media portion obtained from the digital media file to the first client system over the communications network.

9. The system of claim 8, wherein the hardware processor of the media server is further configured to prohibit assignment of the first secondary license for the first digital media portion of the digital media file to a user other than the first user during a first usage interval.

10. The system of claim 8, wherein the hardware processor of the media server is further configured to:

prohibit assignment of the second secondary license for the second digital media portion of the digital media file to a user other than the second user during a second usage interval.

11. The system of claim 8, wherein the first digital media portion includes a number of frames from the digital media file, and wherein the number of frames is less than all frames of the digital media file.

12. The system of claim 8, wherein the first digital media portion of the digital media file is a predetermined playback time less than a playback time for playing back all of the digital media file.

13. A method for use by a media server having a hardware processor, the method comprising:

obtaining from an originating license server, using the hardware processor, a digital media file and an associated first primary license authorizing a number of first secondary licenses;

storing, using the hardware processor, the digital media file in the media server;

receiving, using the hardware processor, a first request for access to the digital media file from a first client system of a first user over a communications network;

determining, using the hardware processor and in response to the first request, whether the number of the first secondary licenses authorized to be granted is reached;

requesting, using the hardware processor, a second primary license for the digital media file from the originating license server, in response to determining that the number of secondary licenses authorized to be granted is reached;

obtaining, using the hardware processor, the second primary license from the originating license server, in response to requesting the second primary license from the originating license server;

providing, using the hardware processor, a temporary license key to the user for making use of a second secondary license authorized based on the second primary license for the digital media file, the temporary license key providing access to a portion or an entirety of the digital media file; and copying or streaming, using the hardware processor, the portion or the entirety of the digital media file to the first client system over the communications network, in response to the first request and provision of the temporary license key, wherein the first primary license and the second primary license authorize the media server to concurrently, at least in part, copy or stream from the same digital media file, thereby eliminating a need for storing another copy of the digital media file in the media server.

14. The method of claim 13, wherein the media server further includes a non-transitory memory, and wherein the method further comprises:

storing, using the hardware processor, data corresponding to the second secondary license in the assignment database of the non-transitory memory.

15. The method of claim 13, wherein the portion or the entirety of the digital media file is streamed to the first client system.

16. The method of claim 13 further comprising canceling the temporary license key.

17. The system of claim 8, wherein the first digital media portion obtained from the digital media file is streamed to the first client system over the communications network, and wherein the second digital media portion obtained from the digital media file is streamed to the second client system over the communications network.

18. The method of claim 1, further comprising:
   storing, using the hardware processor of the media server, first data corresponding to the first secondary license in an assignment database of a non-transitory memory of the media server; and
   storing, using the hardware processor of the media server, second data corresponding to the second secondary license in the assignment database of the non-transitory memory of the media server.

19. The system of claim 8, wherein the hardware processor of the media server is further configured to:
   store first data corresponding to the first secondary license in an assignment database of a non-transitory memory of the media server; and
   storing, using the hardware processor of the media server, second data corresponding to the second secondary license in the assignment database of the non-transitory memory of the media server.

\* \* \* \* \*